United States Patent Office 2,962,522
Patented Nov. 29, 1960

2,962,522

PROCESS FOR THE PREPARATION OF VINYLTIN COMPOUNDS

Ambrose J. Gibbons, Jr., East Brunswick, and Sanders D. Rosenberg, North Plainfield, N.J., assignors to Metal and Thermit Corporation, Woodbridge Township, Middlesex County, N.J., a corporation of New Jersey No Drawing. Filed Nov. 28, 1956, Ser. No. 624,952

5 Claims. (Cl. 260—429.7)

The present invention relates to a process for preparing organotin compounds.

It is an object of the present invention to provide a process for preparing organotin compounds.

Other objects and advantages will become apparent from the following description.

Generally speaking, the present invention contemplates a process for preparing organotin compounds by reacting an organotin oxide with an organomagnesium chloride to yield organotin compounds in accordance with the following equations:

(1) $RR'SnO + 2R''MgCl \rightarrow RR'R''_2Sn + (MgCl)_2O$ (2) $(R_3Sn)_2O + 2R''MgCl \rightarrow 2R_3SnR'' + (MgCl)_2O$ The equations represent the over all synthesis. R and R' may be the same or different, and include substituted and unsubstituted hydrocarbon groups generally. The permissible substituting groups are those functional groups not reactive with magnesium and/or the organomagnesium chloride, under the process conditions. These organotin oxides include dibutyltin oxide, methylbutyltin oxide, dimethyltin oxide, dioctyltin oxide, butyloctyltin oxide, dioctadecyltin oxide, di-4-methyl-1-penten-2-yltin oxide, divinyltin oxide, diallyltin oxide, di-buten-3-yltin oxide, dioleyltin oxide, butylpropen-2-yltin oxide, dicyclopentyltin oxide, dicyclohexyltin oxide, octylcyclohexyltin oxide, dicyclohexenyltin oxide, diphenyltin oxide, butylphenyltin oxide, di-p-chlorophenyltin oxide, di-o-tolyltin oxide, di-p-anisyltin oxide, di-trichlorobiphenyltin oxide, di-p-dimethylaminophenyltin oxide, di-α-thienyltin oxide, di-5-chlorothienyltin oxide, di-6-quinolyltin oxide, di-α-naphthyltin oxide, β-naphthylbutyltin oxide, di-isocrotyltin oxide, dibenzyltin oxide, difluorobutyltin oxide, di-styryltin oxide, di-p-vinylphenyltin oxide, diphenylethyltin oxide, dimethoxyphenyltin oxide, dibutoxyphenyltin oxide, difuryltin oxide, dipyrryltin oxide, dipyrimidyltin oxide, etc.

The organomagnesium chlorides, R"MgCl, refer to the well-known Grignard reagents and include the many reagents known to the art. Reference is made to the "Index of Grignard Reagents" in Kharasch and Reinmuth's book "Grignard Reactions of Nonmetallic Substances," Prentice-Hall, Inc. (1954), for a disclosure and bibliography of many organomagnesium chlorides known to the art. The organomagnesium chlorides disclosed in the Kharasch et al. book have largely been prepared by reacting an organic chloride with magnesium in the presence of a relatively large amount of ethyl ether, usually at least two moles per mole of magnesium. Recently it has been discovered how to prepare organomagnesium chlorides from a wide range of aromatic, vinylic, and pseudo-aromatic heterocyclic chlorides that cannot be prepared in ethyl ether, by reacting the desired organic chloride with magnesium in the presence of tetrahydrofuran, or an equivalent cyclic polymethylene oxide, and suitably initiating the reaction, usually with a reactive halide, e.g., with ethyl bromide, methyl iodide, a crystal of iodine, etc. All organomagnesium chlorides that are known, are operative in the present process and include aliphatic, cycloaliphatic, aromatic and heterocyclic magnesium chlorides. Organic chlorides which do not form the corresponding organomagnesium chlorides, e.g., α,β-vinyl dichloride, of course cannot be utilized. Examples of operative organomagnesium chlorides, R"MgCl, include those having such R" groups as ethyl, tert-butyl, octyl, 2,2-difluoroethyl, octadecyl, benzyl, allyl, β-methallyl, decyl, dodecyl, isopropyl, amyl, phenyl, pentachlorophenyl, o-tolyl, xylyl, vinyl, 4-methyl-1-penten-2-yl, buten-3-yl, oleyl, cyclohexenyl, cyclopentyl, p-anisyl, trichlorobiphenyl, β-naphthyl, diethylaminophenyl, β-thienyl, 6-quinolyl, 5-chlorothienyl, chloromethylquinolyl, etc.

The foregoing illustrative organotin oxides and organomagnesium chlorides operative in this process are indicative of the scope of operative compounds. Diorganotin oxides are usually prepared from diorganotin dihalides.

Although organomagnesium chlorides have been known for about 70 years, their structure has not been definitively determined. There is evidence that the organomagnesium chloride exists in the form of a complex or "etherate." Organomagnesium chlorides are prepared in ethers, such as alkyl ethers, cyclic polymethylene oxide ethers and ethylene polyethers. Once prepared, all, or a large part, of the ether may be replaced by hydrocarbon solvents. When the term organomagnesium chloride is used herein, it is to be understood that it is the material as prepared and used in the Grignard-type synthesis, whether the compound exists as indicated by the formula, R"MgCl, or whether it exists as a complex, or etherate.

Compounds having the general formula $R_3SnR'$ are prepared from compounds having the formula $(R_3Sn)_2O$. The bistriorganotin oxides are generally prepared by dehydration of the corresponding hydroxides. In some cases the stability of the bis triorganotin oxides is such that it is formed in preference to the formation of the hydroxide and it is not necessary to carry out dehydration of the hydroxide, since the product, as formed, is in the form of the oxide. Bis tributyltin oxide is an outstanding example of compounds of this type. Operative R groups include those specified herein for the diorganotin oxides.

The process is usually carried out by suspending or dissolving the organotin oxide reactant in an inert organic solvent. The organomagnesium chloride is then added to the solution, preferably with agitation. A reaction will usually start immediately. In certain cases the organotin oxide would be added to the organomagnesium chloride, usually in an inert organic solvent. The reaction temperature will vary with the reactants and solvents utilized and the products desired and will usually be between room temperature and the reflux temperature of the reaction mixture. The reaction is usually exothermic. For special conditions, it may be necessary to carry the reaction out at low temperatures. Low temperatures are preferred when utilizing reactants containing vinyl groups. The reaction is preferably carried out in an inert atmosphere, usually nitrogen which is the least expensive. The reaction products include one or more of the organotin compounds and a magnesium halide salt cake which may be separated by conventional means, e.g., filtration, drowning in and extraction by acidified water, crystallization, etc. The solvents are usually removed by distillation.

The solvent utilized must be inert to the other components of the reaction mixture under the process conditions and is preferably an organic solvent that distills below 150° C. The preferred solvents include substituted and unsubstituted tetrahydrofuran, tetrahydropyran, heptane, hexane, pentane, octane, isooctane, xylene, etc. A solvent system containing more than one component may also be used. A preferred solvent system is that containing tetrahydrofuran and a hydrocarbon solvent.

The diorganotin oxides are usually not soluble in the solvent systems utilized, and are carried in the solvent as a suspension or dispersion. Certain of the oxides, e.g., bis tributyltin oxide which is liquid, may be in solution.

For the purpose of giving those skilled in the art a better understanding of the invention, the following illustrative examples are given:

Example No. 1

To a mixture of .64 mole of dibutyltin oxide in 2 liters of a commercial hydrocarbon solvent, largely heptane, was added a solution containing 1.6 moles of vinylmagnesium chloride, while heating to between 70° C. and 90° C. The addition was made over a one hour period, while stirring. The reaction mixture was refluxed for an hour and a half and then allowed to stand overnight. It was then hydrolyzed and the supernatant organic phase decanted and dried. The solvent was stripped and the residue distilled under reduced pressure to give dibutyldivinyltin prepared in a 58% yield.

Example No. 2

To a solution of 592 grams (1 mole) of bistributyltin oxide in 2 liters of a commercial heptane hydrocarbon solvent, was slowly added 2.5 moles of vinylmagnesium chloride. The reaction mixture was heated to about 70° C. (or somewhat above) and allowed to reflux for three to four hours after the completion of the addition. The reaction mixture was then cooled and hydrolyzed with dilute (5%) hydrochloric acid to form a precipitated salt cake. The supernatant organic phase was decanted and dried. The solvent was then stripped from the organic phase giving an 85% yield of tributylvinyltin.

Example No. 3

Following the procedure of Example No. 2, two moles of methylmagnesium chloride are reacted with one mole of bis trivinyltin oxide to yield trivinylmethyltin.

Example No. 4

Following the procedure of Example No. 1, two moles of ethylmagnesium chloride are reacted with one mole of diallyltin oxide to yield diethyldiallyltin.

Example No. 5

Following the procedure of Example No. 1, two moles of isopropylmagnesium chloride are reacted with one mole of methylpropen-2-yltin oxide to yield diisopropylmethylpropen-2-yltin.

Example No. 6

Following the procedure of Example No. 1, two moles of tert-butylmagnesium chloride are reacted with one mole of dimethallyltin oxide to yield di-tert-butyldimethallyltin.

Example No. 7

Following the procedure of Example No. 2, two moles of sec-butylmagnesium chloride are reacted with one mole of bis tri(β-phenylethyl)tin oxide to yield two moles of sec-butyl-tri-β-phenylethyltin.

Example No. 8

Following the procedure of Example No. 2, two moles of n-butylmagnesium chloride are reacted with one mole of bis-tri-n-butyltin oxide to yield tetra-n-butyltin.

Example No. 9

Following the procedure of Example No. 1, two moles of n-hexylmagnesium chloride are reacted with one mole of diomegahexenyltin oxide to yield dihexyldiomegahexenyltin.

Example No. 10

Following the procedure of Example No. 1, two moles of octylmagnesium chloride are reacted with one mole of cyclopentamethylenetin oxide to yield dioctyl(cyclopentamethylene)tin.

Example No. 11

Following the procedure of Example No. 1, two moles of dodecylmagnesium chloride are reacted with one mole of didodecyltin oxide to yield tetradodecyltin.

Example No. 12

Following the procedure of Example No. 1, two moles of 2-ethylhexylmagnesium chloride are reacted with one mole of diphenyltin oxide to yield two moles of di-2-ethylhexyldiphenyltin.

Example No. 13

Following the procedure of Example No. 2, two moles of octadecylmagnesium chloride are reacted with one mole of bis tri-p-chlorophenyltin oxide to yield tri-p-chlorophenyloctadecyltin.

Example No. 14

Following the procedure of Example No. 2, two moles of cyclopentylmagnesium chloride are reacted with one mole of tridecyltin oxide to yield cyclopentyltridecyltin.

Example No. 15

Following the procedure of Example No. 1, one mole of 1,5-cyclopentene-bis magnesium chloride are reacted with one mole of didodecyltin oxide to yield didodecyl-(cyclopentamethylene)tin.

Example No. 16

Following the procedure of Example No. 1, two moles of 2,2-difluoroethylmagnesium chloride are reacted with di-α-naphthyltin oxide to yield bis(2,2-fluoroethyl)di-α-naphthyltin.

Example No. 17

Following the procedure of Example No. 2, two moles of 2,2-difluoropropylmagnesium chloride are reacted with one mole of bis tributyltin oxide to yield 2,2-difluoropropyltributyltin.

Example No. 18

Following the procedure of Example No. 1, two moles of benzylmagnesium chloride are reacted with dibenzyltin oxide to yield tetrabenzyltin.

Example No. 19

Following the procedure of Example No. 1, two moles of allylmagnesium chloride are reacted with one mole of di-p-chlorobenzyltin oxide to yield diallyldi-p-chlorobenzyltin.

Example No. 20

Following the procedure of Example No. 1, two moles of magnesium chloride are reacted with two moles of dibutyltin oxide to yield di-β-methallyldibutyltin.

Example No. 21

Following the procedure of Example No. 1, two moles of vinylmagnesium chloride are reacted with one mole of divinyltin oxide to yield tetravinyltin.

Example No. 22

Following the procedure of Example No. 1, two moles of p-chlorophenylmagnesium chloride are reacted with one mole of di-2-penten-2-yl-tin oxide to yield di-p-chlorophenyl-di-2-penten-2-yl tin.

Example No. 23

Following the procedure of Example No. 1, two moles of pentachlorophenylmagnesium chloride are reacted with dioctyltin oxide to yield dioctyldipentachlorophenyltin.

Example No. 24
Following the procedure of Example No. 2, two moles of 2-pyridylmagnesium chloride are reacted with one mole of bis triphenyltin oxide to yield triphenyl-2-pyridyltin.

Example No. 25
Following the procedure of Example No. 2, two moles of 4-methyl-1-penten-2-yl magnesium chloride are reacted with one mole of bis tri-p-anisyltin oxide to yield tri-p-anisyl-4-methyl-1-penten-2-yl tin.

Example No. 26
Following the procedure of Example No. 2, two moles of 5-chlorothienylmagnesium chloride are reacted with one mole of bis p-tolyltin oxide to yield di-5-chlorothenyl-di-p-tolyltin.

Example No. 27
Following the procedure of Example No. 2, two moles of p-anisylmagnesium chloride are reacted with one mole of bis tri-2-propene-2-yltin oxide to yield p-anisyltri-2-propene-2-yl tin.

Example No. 28
Following the procedure of Example No. 1, two moles of 2-butene-2-yl magnesium chloride are reacted with one mole of di-p-tolyltin oxide to yield di-2-butene-2-yl-di-p-tolyltin.

Example No. 29
Following the procedure of Example No. 2, two moles of 2-benzothiazolyl magnesium chloride are reacted with one mole of bis trioctyltin oxide to yield 2-benzothiazolyl-trioctyltin.

Example No. 30
Following the procedure of Example No. 1, one mole of α-thienylmagnesium chloride is reacted with one mole of diphenyltin oxide to yield di-α-thienyldiphenyltin.

Example No. 31
Following the procedure of Example No. 2, two moles of cyclodecylmagnesium chloride are reacted with one mole of bis tributyltin oxide to yield cyclodecyltributyltin.

Example No. 32
Following the procedure of Example No. 2, two moles of biphenylmagnesium chloride are reacted with one mole of bis triallyltin oxide to yield biphenyltriallyltin.

Example No. 33
Following the procedure of Example No. 1, two moles of 2-quinolyl magnesium chloride are reacted with diocta-decyl tin oxide to yield di-2-quinolyl-dioctadecyltin.

Example No. 34
Following the procedure of Example No. 1, two moles of 1-cyclohexenyl magnesium chloride are reacted with dibutyltin oxide to yield di-1-cyclohexenyldibutyltin.

Example No. 35
Following the procedure of Example No. 2, two moles of p-phenetyl magnesium chloride are reacted with one mole of bis triamyltin oxide to yield p-phenetyltriamyltin.

Example No. 36
Following the procedure of Example No. 1, two moles of p-tolylmagnesium chloride are reacted with di-p-tolyltin oxide to yield tetra-p-tolyltin.

Example No. 37
Following the procedure of Example No. 1, two moles of isobutenylmagnesium chloride are reacted with one mole of dibutyltin oxide to yield diisobutenyldibutyltin.

Example No. 38
Following the procedure of Example No. 2, two moles of β-naphthylmagnesium chloride are reacted with bis trimethyltin oxide to yield β-naphthyltrimethyltin.

Example No. 39
Following the procedure of Example No. 1, two moles of isocrotylmagnesium chloride are reacted with one mole of diphenyltin oxide to yield diisocrotyldiphenyltin.

Example No. 40
Following the procedure of Example No. 1, two moles of p-chlorobenzylmagnesium chloride are reacted with di-p-chlorobenzyltin oxide to yield tetra-p-chlorobenzyltin.

Example No. 41
Following the procedure of Example No. 1, two moles of vinylmagnesium chloride are reacted with one mole of di-2-benzoxazolyltin oxide to yield divinyldi-2-benzoxazolyltin.

Example No. 42
Following the procedure of Example No. 1, two moles of octylmagnesium chloride are reacted with one mole of di-2-quinolyltin oxide to yield di-2-quinolyldioctyltin.

Example No. 43
Following the procedure of Example No. 1, two moles of methylmagnesium chloride are reacted with one mole of di-1-cyclohexenyltin oxide to yield dimethydi-1-cyclohexenyltin.

Example No. 44
Following the procedure of Example No. 1, two moles of vinylmagnesium chloride are reacted with one mole of pentamethylenetin oxide to yield divinylpentamethylenetin.

This process is an alternative preparation of organotin compounds to that utilizing the organotin halide as a reactant in place of the organotin oxide. In specific cases the oxide material is easier to prepare in a pure form than the corresponding halide. The oxide material is easier to store and it is sometimes more economical to add the process step of preparing the organotin oxide from the organotin halide and obtain a material which is easily stored and which allows greater flexibility in scheduling operations.

As many embodiments of this invention may be made without departing from the spirit and scope thereof, it is to be understood that the invention is not limited to the specific embodiments herein set forth but is to be restricted solely by the scope of the appended claims.

We claim:

1. A process for producing organotin compounds comprising reacting a hydrocarbontin oxide selected from the class consisting of dihydrocarbontin oxides and bis trihydrocarbontin oxides, with vinylmagnesium chloride, to produce a vinyltin compound selected from the class consisting of divinyldihydrocarbontin compounds and vinyltrihydrocarbontin compounds, respectively.

2. A process for producing organotin compounds comprising reacting a dihydrocarbontin oxide with vinyl-magnesium chloride to prepare a divinyldihydrocarbontin compound and recovering said divinyldihydrocarbontin compound from the reaction mixture.

3. A process for producing organotin compounds comprising reacting a bis trihydrocarbontin oxide with vinylmagnesium chloride to prepare a vinyltrihydrocarbontin compound, and recovering said vinyltrihydrocarbontin compound from the reaction mixture.

4. A process for producing organotin compounds comprising reacting a dihydrocarbontin oxide in an inert organic solvent, with vinylmagnesium chloride, to produce a divinyldihydrocarbontin compound, and recovering said divinyldihydrocarbontin compound from the reaction mixture.

5. A process for producing organotin compounds comprising reacting a bis trihydrocarbontin oxide in an inert organic solvent, with vinyl magnesium chloride, to produce a vinyltrihydrocarbontin compound, and recovering said vinyltrihydrocarbontin compound from the reaction mixture.

References Cited in the file of this patent

UNITED STATES PATENTS

| | | |
|---|---|---|
| 2,675,399 | Ramsden et al. | Apr. 13, 1954 |
| 2,801,258 | Johnson | July 30, 1957 |

OTHER REFERENCES

Krause et al.: "Die Chemie der metall-organischen Verbindungen," Photo-Lithoprint Reproduction, Edwards Brothers, Inc., publishers, Ann Arbor, Michigan (1943), pp. 58 and 59 relied on.

Luijten et al.: "Investigations in the Field of Organic Chemistry," Tin Research Institute, England (October 1955), pp. 84–85.